R. RUEMELIN.
LUBRICATOR FOR HOISTING ENGINES.
APPLICATION FILED DEC. 11, 1909.
1,119,880.
Patented Dec. 8, 1914.
2 SHEETS—SHEET 1.
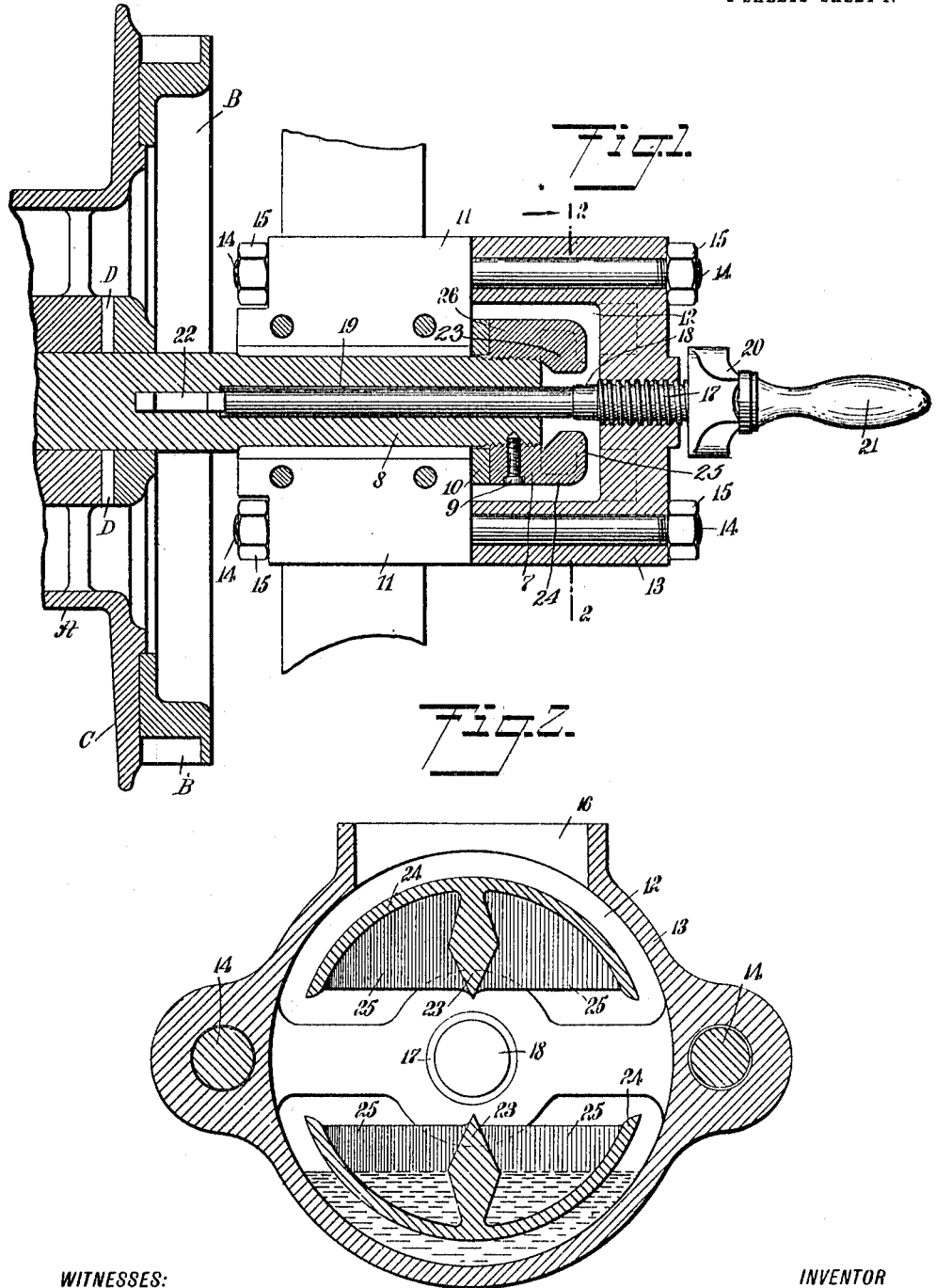
WITNESSES:
INVENTOR
Richard Ruemelin
BY
ATTORNEYS

R. RUEMELIN.
LUBRICATOR FOR HOISTING ENGINES.
APPLICATION FILED DEC. 11, 1909.

1,119,880.

Patented Dec. 8, 1914.
2 SHEETS—SHEET 2.

WITNESSES:

INVENTOR
Richard Ruemelin
BY
ATTORNEYS

UNITED STATES PATENT OFFICE.

RICHARD RUEMELIN, OF PHILADELPHIA, PENNSYLVANIA.

LUBRICATOR FOR HOISTING-ENGINES.

1,119,880. Specification of Letters Patent. Patented Dec. 8, 1914.

Application filed December 11, 1909. Serial No. 532,576.

*To all whom it may concern:*

Be it known that I, RICHARD RUEMELIN, a citizen of the United States, and a resident of Philadelphia, in the county of Philadelphia and State of Pennsylvania, have invented a new and Improved Lubricator for Hoisting-Engines, of which the following is a full, clear, and exact description.

The principal objects of the present invention are: to provide a lubricator for the thrust pin of a hoisting engine drum; to provide a lubricator of the character described adapted to operate as a splash lubricator; to provide a splash lubricator of simplified and efficient form; and to provide a lubricator arranged to act as a thrust bearing for a winding drum shaft.

One embodiment of the present invention is disclosed in the structure illustrated in the accompanying drawings, in which like characters of reference denote corresponding parts in all the views, and in which—

Figure 5:
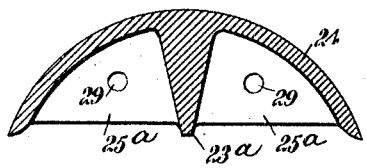
Figure 3:
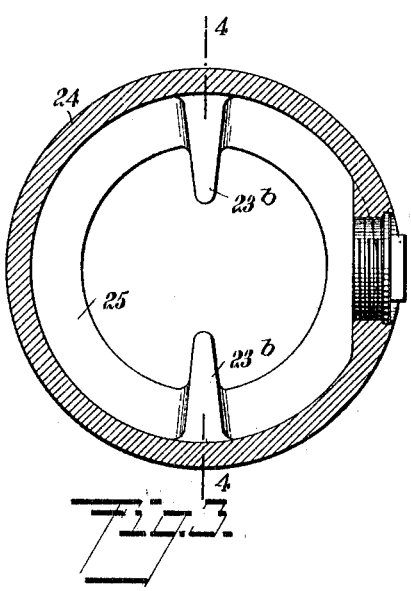
Figure 4:
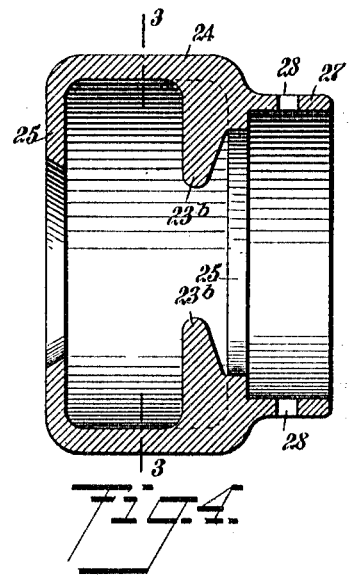

Figure 1 is a horizontal section of a winding drum, bearing box, shift mechanism, shaft, and lubricator connected therewith, and constructed in conformity with the present invention; Fig. 2 is a cross section of the lubricating chamber, taken on the line 2—2 in Fig. 1. The lubricator in this figure is shown as rotated to a position perpendicular to that shown in Fig. 1. Fig. 3 is a cross section taken on the line 3—3 in Fig. 4, of a modified form of the present invention; Fig. 4 is a longitudinal section, taken on the line 4—4 in Fig. 3, of the same modified form of the invention; Fig. 5 is a detail view in cross section of a form resembling that shown in Fig. 2 and slightly modified therefrom.

While the invention is shown in the present drawings in its application to the driving shaft of a rotary drum hoist, its employment is not limited to such construction. It may be attached to any form of shaft and secured in position thereon at the end thereof to supply oil to a thrust bearing, wherein the axle or shaft to which the device is applied is diminished in diameter to form the said bearing, and where the box containing oil may be inserted and employed.

In its present application a lubricator 7 is secured upon the end of a shaft 8 by means of screw threads formed thereon, as illustrated in Fig. 1 of the drawings. The lubricator 7 is held rigidly in position when set up, by a set screw 9. In the form of machine illustrated in the accompanying drawings the lubricator 7 is used to form a thrust head or nut, and is provided for that purpose with a bearing washer 10 interposed between the rear face of the said lubricator and the bearing box 11 provided for the shaft 8. The lubricator is thus rigidly secured to the shaft 8 and rotates therewith. The lubricator rotates within a chamber 12 formed by a box-like casing 13, shown in section in Fig. 1 of the drawings. The casing 13 is machined at the inner end to form a close joint between the face thereof and the face of the bearing 11. The casing 13 is a hollow metal casting, formed preferably in the manner shown in Figs. 1 and 2, wherein the said casing is secured by means of bolts 14, 14 to the said bearing 11 and by means of screw nuts 15, 15. In the upper side of the said casing 13 is formed an oil feed opening 16. Through the reinforced center of the casing 13 is extended a perforation, suitably threaded to receive a flat threaded feed screw 17, the end 18 whereof is held in contact with and forms a bearing for a thrust pin 19. At this point the pressure is so excessive that the heat and wear would likewise be excessive if not thoroughly and liberally lubricated. This is accomplished by the construction and arrangement herein described. Rigidly connected with the screw 17 and extended therefrom is a crank 20, having a handle 21, as shown in Fig. 1 of the drawings. It is by means of the crank 20 that the screw 17 is rotated to press upon the thrust pin 19 to force the same against a cross bar 22, whereby the winding drum A is shifted on the shaft 8 to frictionally engage the driving mechanism of the hoist.

It is not considered necessary to describe the construction or operation of the hoisting machine with which this invention is illustrated to show the application thereto. To prevent confusion, however, it is deemed wise to say that the letter B designates the large ratchet wheel with which the drum A is provided, and which is usually attached by suitable screws to the end flange C. Also that the letters D, D designate a thrust washer with which the hub of the drum is usually provided for holding the drum in position on the shaft 8. For the purpose of understanding the present invention, it is only necessary to know that the drum is shifted laterally on the shaft 8 to be rotatably engaged by the driving mechanism of the hoist, and that this is accomplished by means of the screw 17 and the thrust pin 19.

The necessary thrust to produce the needed friction of the drum A against the friction pulley of the driving mechanism, is such that the wear on the bearing of the end 18 and the thrust pin 19 is very intense. It being impracticable to immerse the bearing in oil, the present device is employed, whereby oil is being constantly raised above and dropped upon the point of contact between the said end 18 and pin 19. This is done by the lubricator 7.

Several forms of the lubricator constructed in accordance with the present invention are shown in the accompanying drawings. In all of the forms there is provided one or more vanes which extend from the central opening provided to pass the screw 17 and the end 18 thereof. At the end of the vanes 23, removed from the opening above set forth, is provided a curved wall 24. The wall 24 may be segmental, as shown in Fig. 2, or continuous, as shown in Figs. 3 and 4. Whether in the segmental or cylindrical form, the ends are partly closed by partitions 25, 25. These partitions, in conjunction with the wall 24, form cup-like or bucket-like devices for holding or scooping up the oil contained in the chamber 12. Whether formed in the segmental or cylindrical form the lubricating devices are rigidly attached to rotate with the shaft 8.

In the form illustrated in Fig. 1, the lubricators are projected from a solid cylindrical body portion 26, suitably perforated and threaded to form a long nut for mounting upon the shaft 8, the threads and construction throughout being formed sufficiently heavy and strong to enable the body portion 26 to be used as a nut to withstand the end thrust of the shaft 8. This is most desired by me for the construction of the lubricator.

In the form illustrated in Figs. 3 and 4 there is provided a collar 27 arranged to be slipped over the shaft 8 and to be held thereon by means of suitable screws inserted through the flange of the collar, and through perforations 28, 28 formed therein. In this view the vanes are designated by the numeral 23$^b$.

In the form illustrated in Fig. 5 the lubricator is formed of one or more small sections, wherein the vanes 23$^a$ and the wall 24 are joined by the partitions 25$^a$. The partitions 25$^a$ on the one side are provided with perforations 29, 29. The perforations 29, 29 serve to secure the small bucket-like devices to a suitable thrust bearing face or plate provided for that purpose.

The variations illustrated in the drawings as to the form and arrangement of the vanes bear the universal feature in that they, when rotated, form constantly rising and upwardly carrying buckets or receptacles, adapted to lift the oil from the bottom of the chamber 12 and to deliver the same directly upon the bearing point, which in the present adaptation is the end of the thrust pin 19 and the end 18 of the screw 17.

The lubricator is mounted entirely separate on the drum shaft from the part which is to be lubricated, so that the lubricator is acting even when there is no friction or heating. The lubricator consists of distinct buckets having an outer flange or rim and an inner flange with a deflector or partition to throw the oil toward the friction point. The buckets are arranged to cover a considerable portion on each side of the friction point, thus giving a greater cooling action and avoiding the necessity of adjustment. The buckets are arranged opposite each other so that the oil drops from the raised buckets to the bottom bucket. The device operates by simple splash lubrication; the oil falls through space and in splashing upon the friction pin produces thorough and broad lubrication by impact. The oil is raised by buckets to an inclined position, held by centrifugal force, and is released by gravity in the highest position. The oil falls through space upon the friction surface and then falls into the lower bucket, thus assuring a filled bucket below for its successful operation, even when there is but little oil in the casing. The oil, in falling through space from one bucket to the other, is cooled thereby, assuring better lubricating conditions. As the lubricator is mounted separate from the thrust pin, it continues to lubricate and cool the friction point while the drum shaft is revolving and when the thrust pin and screw are separated.

Having thus described my invention, what I claim as new and desire to secure by Letters Patent is:—

1. The combination, with a drum shaft, of a thrust pin having a lengthwise movement in said shaft and projecting beyond the outer end thereof, a feed screw mounted to contact with the outer end of said pin and force it inwardly, a lubricator casing encircling the projecting end of said pin and adapted to contain a supply of oil, a lubricator mounted to revolve within said casing and having a peripheral wall encircling the outer end of said pin and end walls projecting inwardly from the outer portion of said peripheral wall, a space being provided between said end walls to allow contact of said screw with said pin, said peripheral wall having inwardly projecting vanes thereon forming, with said peripheral and end walls, oil supporting buckets, the point of contact of said pin and screw being within the confines of the inner and outer walls of said buckets, the oil falling from one bucket to the other as said casing revolves bridging the gap between the opposite vanes and being aerated and lubricating the bearing of said pin and screw by impact therewith.

2. The combination, with a drum shaft and a bearing therefor beyond which the end of said shaft projects, of a thrust pin fitting within a socket in said shaft and having a lengthwise movement therein and projecting beyond the outer end thereof, a feed screw mounted to contact with the outer end of said pin, a lubricator casing encircling the projecting end of said pin and adapted to contain a supply of oil, a lubricator mounted to revolve within said casing and having buckets, each comprising an outer peripheral wall and end walls coöperating to scoop up the oil in said casing, the openings to said buckets being opposite the point of contact of said pin and screw and spaced therefrom, the oil falling by gravity when said buckets are inverted during their revolution and splashing the point of contact of said pin and screw.

3. The combination, with a drum shaft, of a thrust pin having a longitudinal movement in said shaft and projecting beyond the outer end thereof, a feed screw mounted to contact with the outer end of said pin, a lubricator casing inclosing the outer end of said pin and adapted to contain a supply of oil, a lubricator mounted to revolve within said casing and having oil buckets, the point of contact of said pin and screw being between said buckets and spaced therefrom and in the path of the oil falling by gravity from one bucket to another, the zone of lubrication of the bearing surfaces of said pin and screw being between the end walls of said buckets, said buckets being open on the side opposite the contact point of said pin and screw, the oil dropping through the gap between the bucket and pin and lubricating by impact the bearing surface of said pin and screw.

4. The combination, with a shaft, of a thrust pin having a lengthwise movement in said shaft and projecting beyond the outer end thereof, a feed screw mounted to contact with the outer end of said pin to force it inwardly, a lubricator casing, a lubricator mounted to revolve with said shaft within said casing and having peripheral buckets formed thereon, said buckets having inwardly projecting vanes provided with recesses therein and peripheral walls coöperating with said vanes to retain the oil against centrifugal force, said buckets being open opposite the point of contact of said pin and screw, the oil falling from one bucket to the other as said lubricator revolves and bridging the gap between opposite vanes and lubricating the bearing of said pin and screw by impact therewith.

In testimony whereof I have signed my name to this specification in the presence of two subscribing witnesses.

RICHARD RUEMELIN.

Witnesses:
W. H. Derr, Jr.,
L. A. Kaler.

Copies of this patent may be obtained for five cents each, by addressing the "Commissioner of Patents, Washington, D. C."